(12) United States Patent
Schrenkel et al.

(10) Patent No.: US 6,394,183 B1
(45) Date of Patent: May 28, 2002

(54) SYSTEM AND METHOD FOR REMOVING SOLID PARTICULATES FROM A PUMPED WELLBORE FLUID

(75) Inventors: Peter Schrenkel, Carrollton, TX (US); Jimmie H. Naylor, Tulsa, OK (US); Roy R. Fleshman, Morrison, OK (US); Kevin T. Scarsdale, Bartlesville, OK (US); Rodger D. Lacy, Houston; Dwight Chilcoat, Fresno, both of TX (US)

(73) Assignee: Schlumberger Technology Corporation, Rosharon, TX (US)

( * ) Notice: Subject to any disclaimer, the term of this patent is extended or adjusted under 35 U.S.C. 154(b) by 0 days.

(21) Appl. No.: 09/625,241

(22) Filed: Jul. 25, 2000

(51) Int. Cl.[7] ................................................. E21B 43/38
(52) U.S. Cl. .................. 166/265; 166/105.1; 166/105.4
(58) Field of Search .............................. 166/265, 54.1, 166/68, 105.1, 105.3, 105.4, 325

(56) References Cited

U.S. PATENT DOCUMENTS

| | | | | |
|---|---|---|---|---|
| 1,720,863 A | * | 7/1929 | Stebbins | |
| 2,114,780 A | * | 4/1938 | Juelson | 183/24 |
| 2,158,717 A | * | 5/1939 | Brock | 230/133 |
| 2,732,032 A | * | 1/1956 | Sandison | 183/80 |
| 2,744,721 A | * | 5/1956 | Hatch | 253/32 |
| 3,289,608 A | * | 12/1966 | Laval, Jr. | 103/220 |
| 3,512,651 A | * | 5/1970 | Laval, Jr. | 210/512 |
| 3,944,380 A | * | 3/1976 | Kampe | 415/1 |
| 4,047,912 A | * | 9/1977 | Markland | 55/406 |
| 4,066,552 A | * | 1/1978 | Caine | 210/304 |
| 4,072,481 A | * | 2/1978 | Laval, Jr. | 55/177 |
| 4,155,681 A | * | 5/1979 | Linko, III et al. | 415/144 |
| 4,390,061 A | * | 6/1983 | Short | 166/53 |
| 4,588,351 A | * | 5/1986 | Miller | 415/47 |
| 4,971,518 A | * | 11/1990 | Florin | 415/121.2 |
| 5,000,769 A | * | 3/1991 | Raguideau et al. | 55/406 |
| 5,277,232 A | * | 1/1994 | Borsheim | 141/65 |
| 5,368,735 A | * | 11/1994 | Ford | 210/512.1 |
| 5,482,117 A | * | 1/1996 | Kolpak et al. | 166/265 |
| RE35,454 E | * | 2/1997 | Cobb | 166/265 |
| 5,662,167 A | * | 9/1997 | Patterson et al. | 166/265 |
| 6,167,960 B1 | * | 1/2001 | Moya | 166/105.1 |
| 6,189,613 B1 | * | 2/2001 | Chachula et al. | 166/265 |
| 6,216,788 B1 | * | 4/2001 | Wilson | 166/311 |
| 6,269,880 B1 | * | 8/2001 | Landry | 166/265 |

FOREIGN PATENT DOCUMENTS

WO     WO 97/11254    *  3/1997    ........... E21B/43/40

* cited by examiner

Primary Examiner—David Bagnell
Assistant Examiner—Daniel P Stephenson
(74) Attorney, Agent, or Firm—Fletcher, Yoder & Van Someren

(57) ABSTRACT

A system for removing solid particulates from a production fluid. The system includes a solid separator to remove the solid particulates from the production fluid to reduce pump component wear. The system is disposed in a wellbore such that wellbore fluids are drawn into the solids separator before entering the submersible pump. Solid particulates are separated from the fluid that flows through the solids separator before entering the submersible pump. The solid particulates are routed past the submersible pump. The solid particulates may be reinjected into the fluid discharged from the pump.

36 Claims, 13 Drawing Sheets

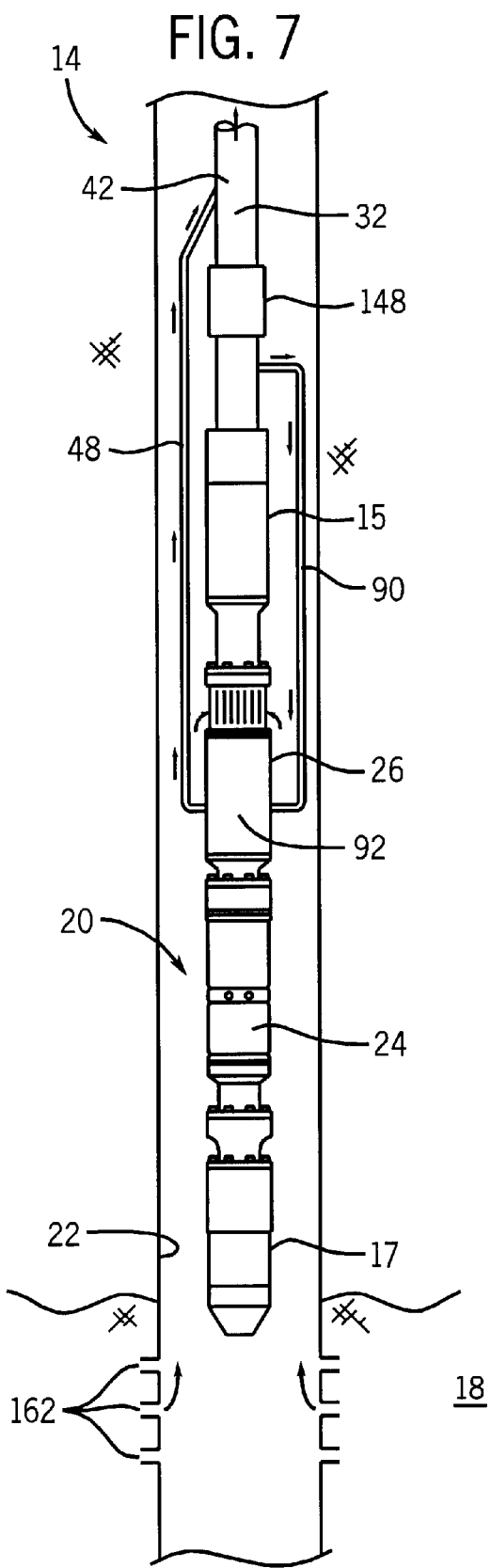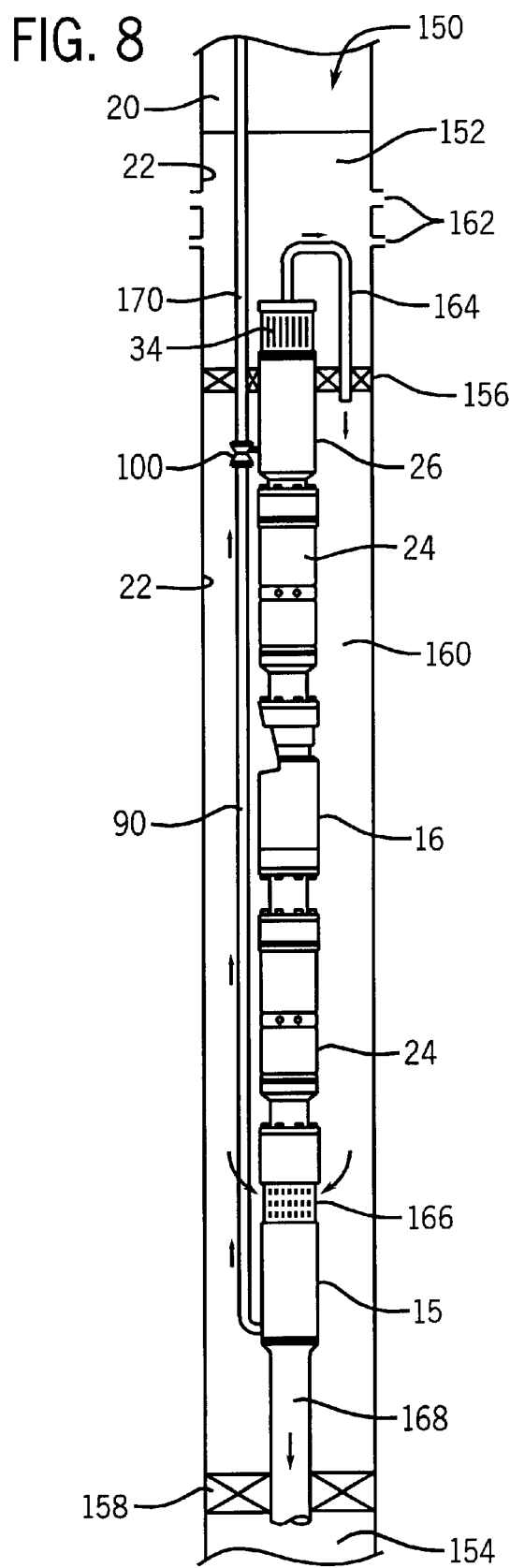

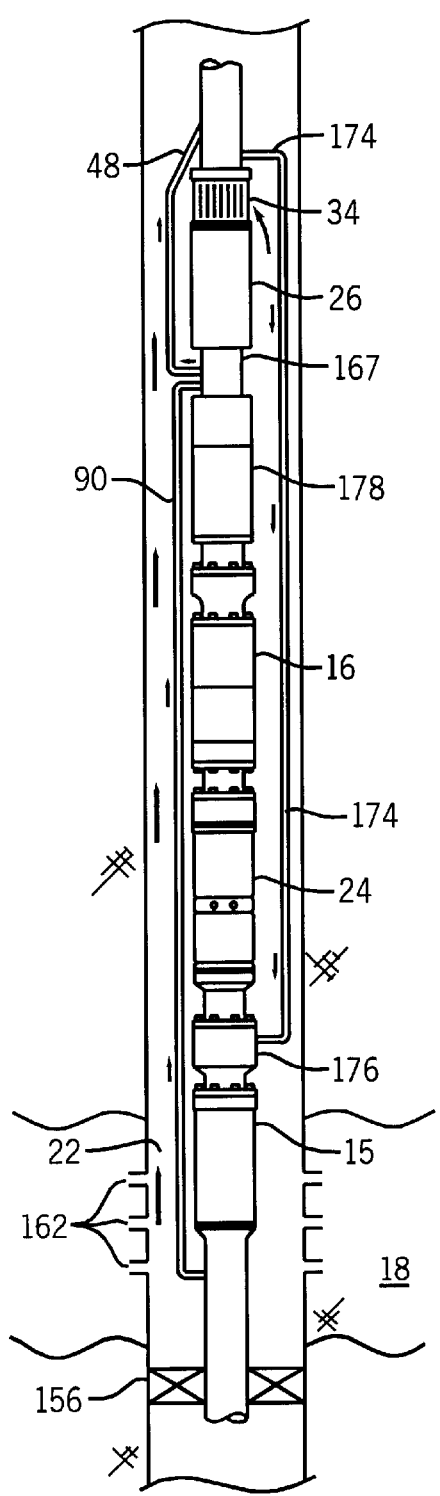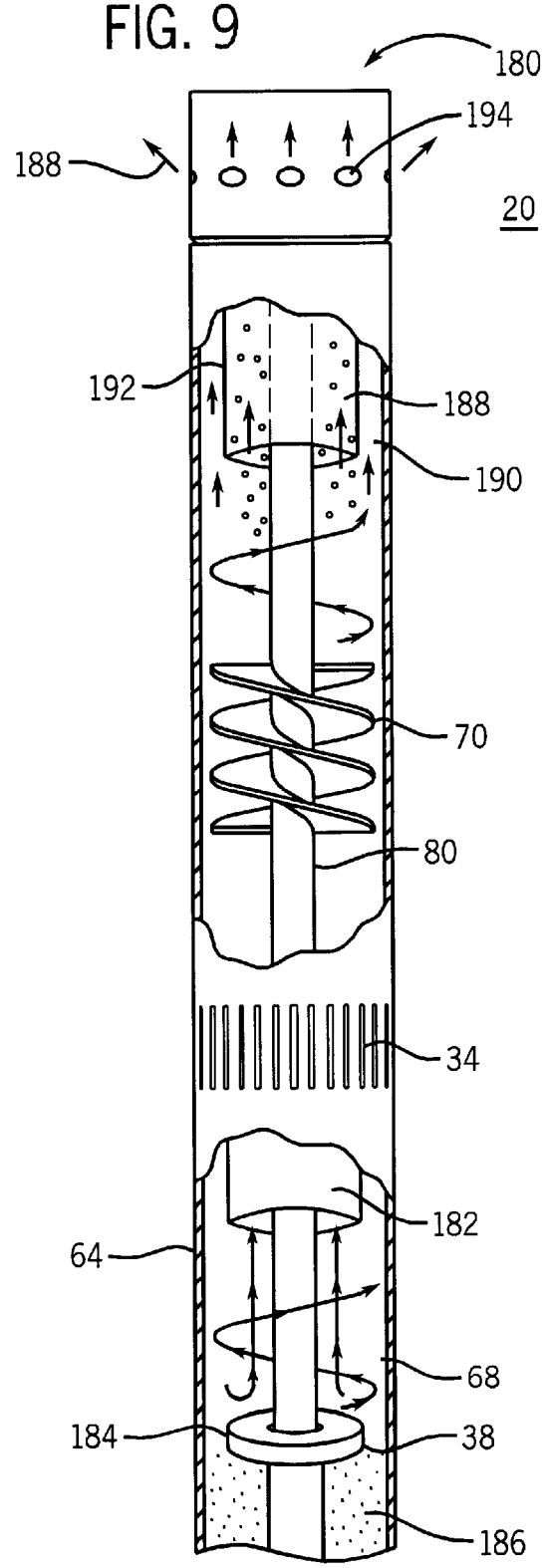

FIG. 10
FIG. 10A
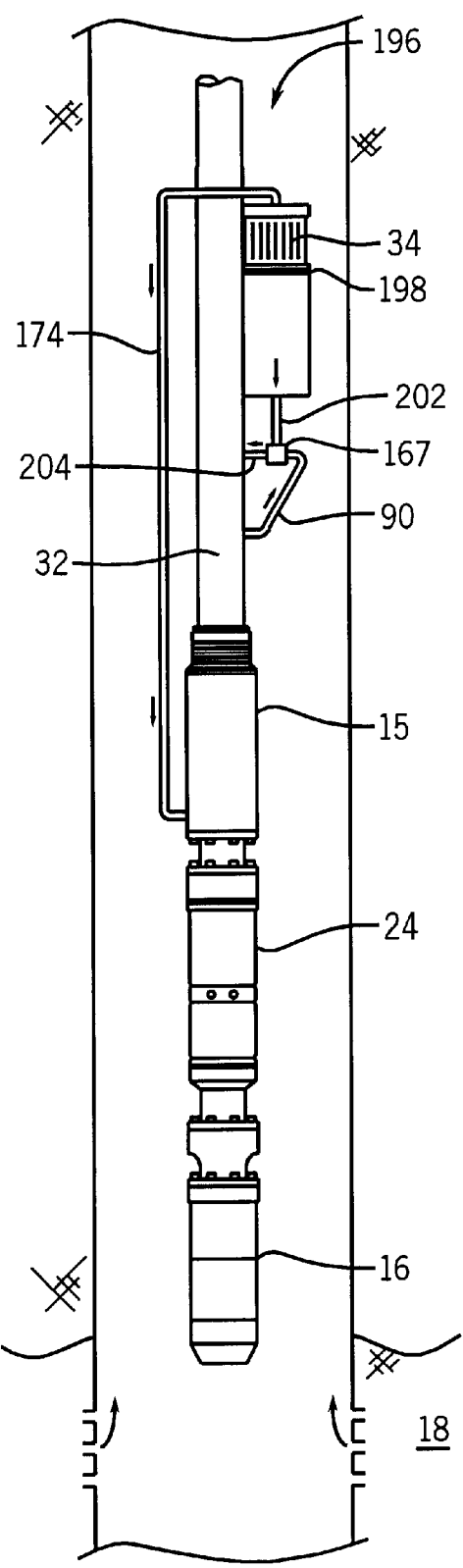
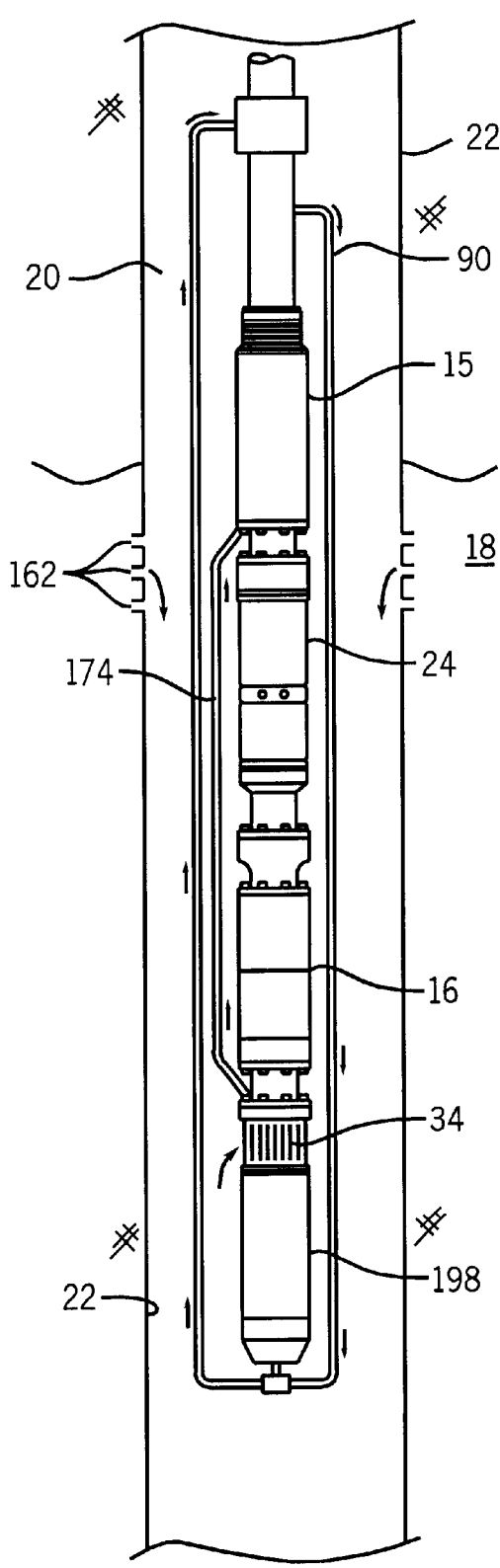

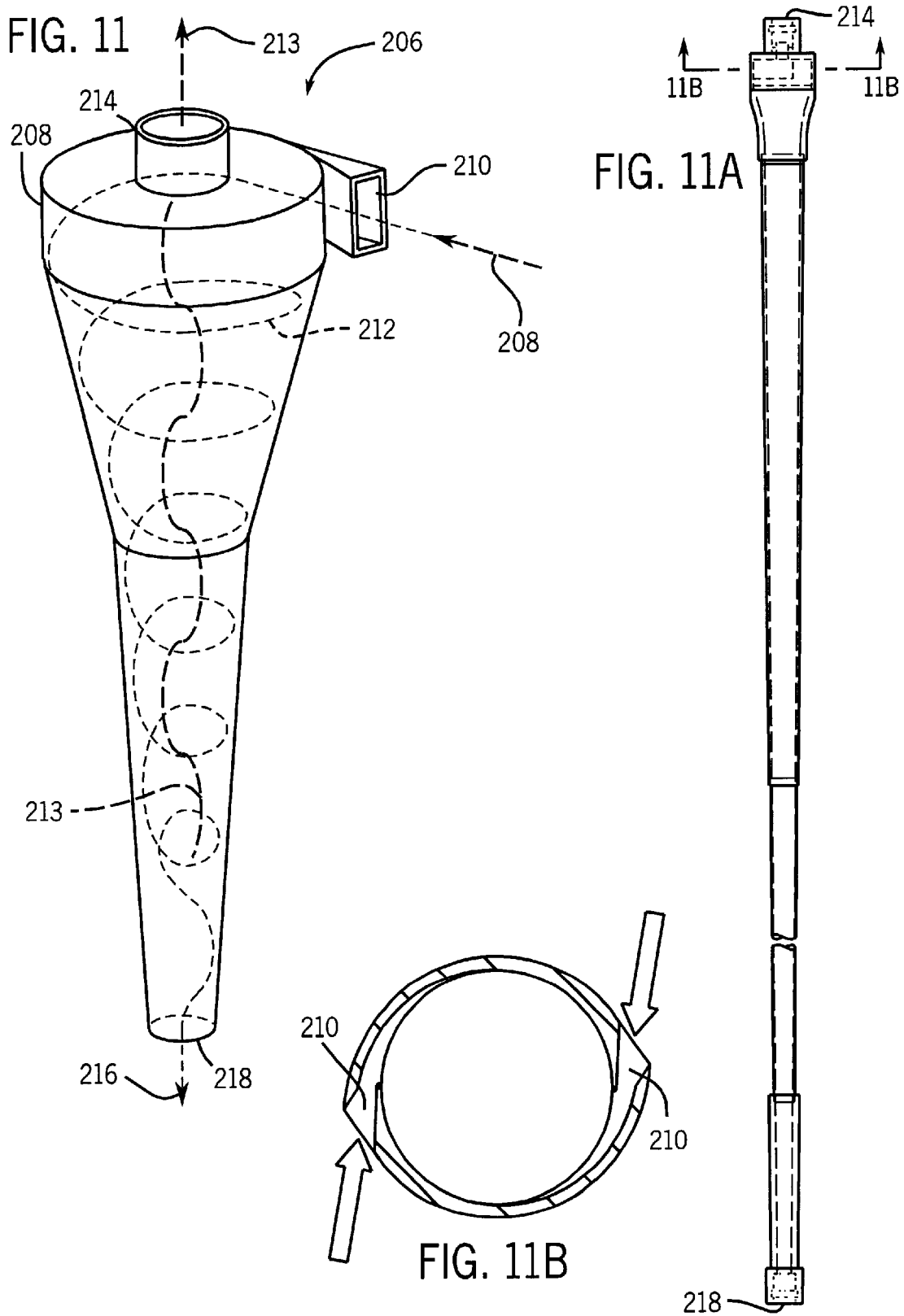

SYSTEM AND METHOD FOR REMOVING SOLID PARTICULATES FROM A PUMPED WELLBORE FLUID

FIELD OF THE INVENTION

The present invention relates generally to submersible pumping systems that are used to raise production fluids from a well, and particularly to a system and method for removing solid particulates, such as sand, from the wellbore fluid upstream from the pump. The particulates may then be reinjected into the wellbore fluid stream discharged from the pump.

BACKGROUND OF THE INVENTION

In producing petroleum and other useful fluids from production wells, a variety of submersible pumping systems are used to raise the fluids collected in a well. Generally, a wellbore is drilled into the earth at a production formation and lined with a wellbore casing. The casing generally includes perforations through which the production fluids may flow from the production formation into the wellbore. The fluids that collect in the wellbore are raised by the submersible pumping system to another zone or to a collection point above the surface of the earth.

One exemplary submersible pumping system is an electric submersible pumping system that utilizes a submersible electric motor and a submersible pump. The system further may include other components, such as sensor equipment, gas separators, and motor protectors for isolating the motor oil from the well fluids.

Also, a connector is used to connect the pumping system to a deployment system. A variety of deployment systems may be used to deploy the pumping system within a wellbore. For example, cable, coil tubing or production tubing may be utilized.

Power is supplied to the submersible electric motor via a power cable that runs along the deployment system. Typically, the power cable is banded or supported along either the outside or the inside of the deployment system. Generally, the power cable is routed to the electric motor to supply electric power thereto, and the motor powers the submersible pump by an appropriate drive shaft.

In many wellbore environments, the production fluids contains particulates, such as sand. These solid particulates are drawn into the submersible pump through a pump intake along with the production fluid. However, the solids can cause detrimental wear to the internal components of the submersible pump. For example, if a centrifugal type pump is used, the solid particulates can create substantial wear on the impellers, the diffusers and other internal pump components.

Submersible pumping systems also are used to inject water from one zone within a well to a second zone within the well, or to dispose of surface water to an existing aquifer. If the geologic formation surrounding the first zone is sandstone, then it is very likely that sand will be injected into the second zone. Forcing sand into an aquifer eventually cause the aquifer to plug and no longer accept fluid.

It would be advantageous to have a system and method for removing at least a portion of the solid particulates from the wellbore fluid upstream from the pump. It would also be advantageous to have a system that could reinject the solid particulates into the fluid stream discharged from the pump, if desired, or produce a fluid stream free of at least a portion of solid particulates.

SUMMARY OF THE INVENTION

The present invention features a system for pumping a wellbore fluid while reducing the detrimental effects of solids dispersed in the wellbore fluid. The system includes a submersible pumping system having a plurality of sequentially connected components arranged for deployment in a wellbore. Specifically, the submersible pumping system includes a submersible motor, a submersible pump and a solids separator. The solids separator is disposed to remove solid particulates prior to entrance of the solids into the submersible pump.

According to another aspect of the invention, a submersible pumping system is provided to reduce wear on a submersible pump by routing solid particulates around the pump. The system includes a submersible pump able to intake a fluid and discharge the fluid in a fluid discharge stream. Additionally, a particulate separator is disposed to receive wellbore fluid prior to entrance of the fluid into the submersible pump. The particulate separator has a separator region and a particulate collection region where the solid particulates may be concentrated.

The system further includes a pressure reduction device having a venturi disposed to receive the fluid stream discharged from the submersible pump. This creates a low pressure region proximate the venturi that permits reinjection of the solid particulates into the wellbore fluid discharged by the pump. A bypass is connected between the particulate collection region of the particulate separator and the low pressure region proximate the venturi. The low pressure draws a concentrated mixture of solid particulates and fluid from the particulate collection region through the bypass and into the fluid stream being discharged from the submersible pump. In other words, solid particulates are routed around the submersible pump to reduce wear on internal pump components.

According to another aspect of the present invention, a method is provided for pumping a production fluid. The method includes powering a submersible pump with a submersible motor, and intaking a wellbore fluid intermediate the submersible pump and a fluid intake. The method further includes separating solid particulates from the wellbore fluid to be pumped by the submersible pump. Following separation, the solid particulates may be reinjected into a fluid discharge stream of the submersible pump.

BRIEF DESCRIPTION OF THE DRAWINGS

The invention will hereafter be described with reference to the accompanying drawings, wherein like reference numerals denote like elements, and:

FIG. 7 is a front elevational view of a pumping system disposed in a wellbore, according to an embodiment of the present invention;

FIG. 8 is a front elevational view of a pumping system disposed in a wellbore to pump fluids from one region of the wellbore to another region of the wellbore, according to an embodiment of the present invention;

FIG. 8A is a front elevational view of an alternative embodiment of a pumping system disposed in a wellbore to pump fluids from one region of the wellbore to another region;

FIG. 9 is a partially cut-away view of an integral solids separator and gas separator, according to an embodiment of the present invention;

FIG. 10 is a front elevational view of a pumping system disposed in a wellbore with the solids separator disposed separate from the submersible motor and pump, according to an embodiment of the present invention;

FIG. 10A is a front elevational view of an alternative embodiment of a pumping system with the solids separator disposed separate from the submersible motor and pump, according to an embodiment of the present invention;

FIG. 11 is a functional diagram of a hydrocyclone separator utilized with the present invention;

FIG. 11A is a front elevational view of the hydrocyclone illustrated in FIG. 11 and showing internal features in dashed lines;

FIG. 11B is a cross-sectional view of the hydrocyclone taken generally along line 11B—11B of FIG. 11A;

DETAILED DESCRIPTION OF THE PREFERRED EMBODIMENTS

Figure 1:
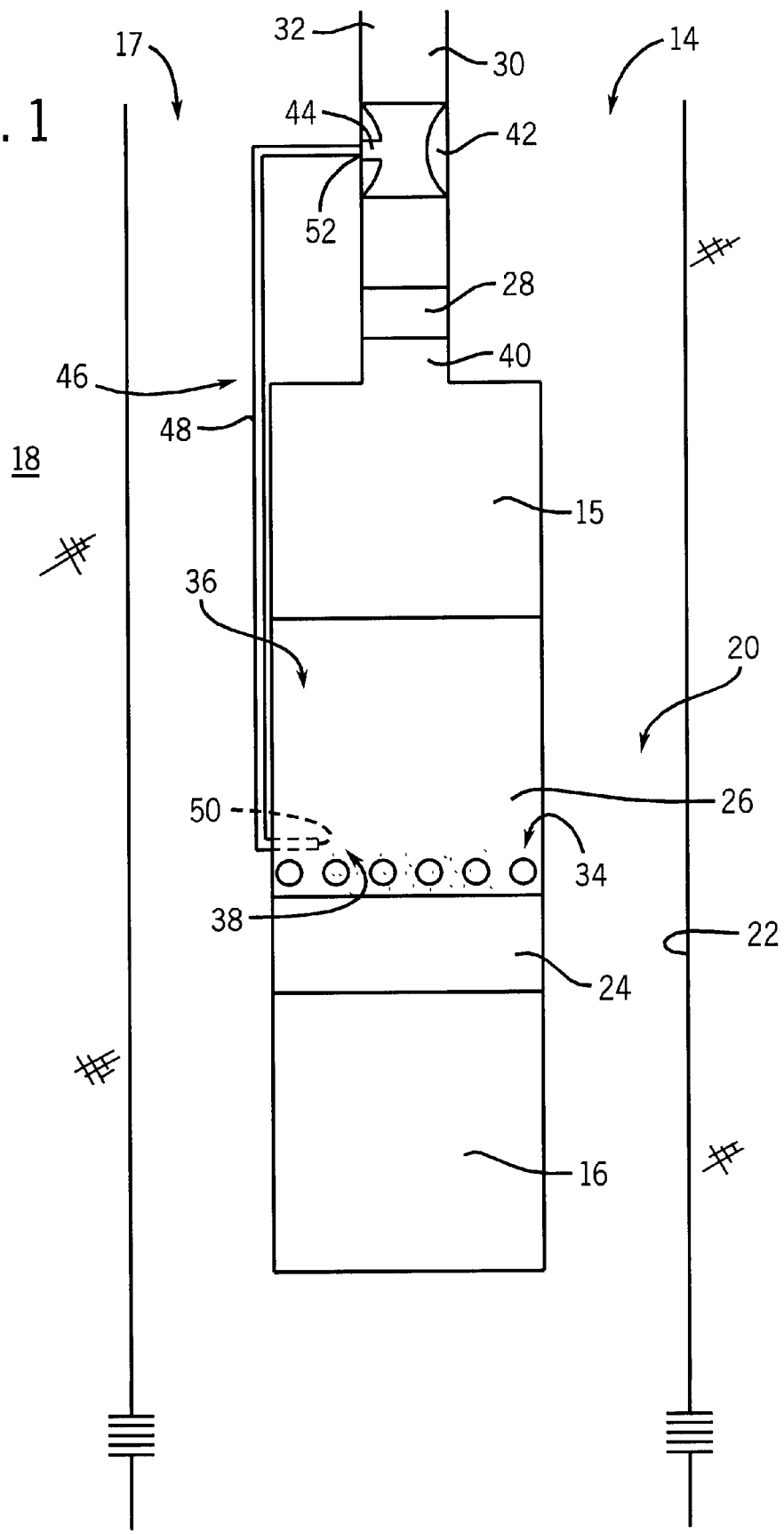
FIG. 1 is a front elevational view of a pumping system disposed in a wellbore, according to an embodiment of the present invention.

Referring generally to FIG. 1, a pumping system 14 is illustrated according to an exemplary embodiment of the present invention. Pumping system 14 is a submersible pumping system designed for deployment in a subterranean environment for pumping fluids. Pumping system 14 may comprise a variety of components depending on the particular application or environment in which it is used. However, system 14 typically includes at least a submersible pump 15 and a submersible motor 16.

Pumping system 14 is designed for deployment in a well 17 within a geological formation 18 containing desirable production fluids, such as petroleum. In a typical application, a wellbore 20 is drilled and lined with a wellbore casing 22. Pumping system 14 may be submerged in a desired fluid within wellbore 20 at a desired location for pumping the wellbore fluids to another zone or directly to the surface of the earth.

As illustrated, submersible pumping system 14 typically includes other components. For example, submersible motor 16 may be connected to a motor protector 24 that serves to isolate the motor oil contained in submersible motor 16 from the wellbore fluids. Additionally, system 14 includes a solids separator 26 and a connector 28 designed to connect the string of submersible pumping components to a deployment system 30.

In the illustrated embodiment, deployment system 30 includes tubing, such as production tubing 32, through which the wellbore fluids are pumped to another zone or to the surface of the earth. Generally, a power cable (not shown) extends along production tubing 32 and is connected to submersible motor 16 to provide electric power thereto.

In the preferred embodiment, solids separator 26 is combined with a pump intake 34. Solids separator 26 is disposed on an upstream side of submersible pump 15, such that wellbore fluid may be drawn through pump intake 34 by submersible pump 15. When wellbore fluid enters pump intake 34 it moves into a solids separation region 36 (see FIG. 2) where solid particulates are separated from the incoming wellbore fluid. The solid particulates are moved to or settle to a particulate collection region 38 of solids separator 26.

The wellbore fluid, from which the solid particulates, such as sand, have been removed, is drawn into submersible pump 15 and pumped through an outlet end 40 as a discharged fluid stream. The discharged fluid stream is directed into production tubing 32 and a pressure reduction device 42, e.g. a jet pump, that creates a reduced pressure region 44 downstream of submersible pump 15.

A bypass 46, such as a bypass conduit 48 is connected between particulate collection region 38 and reduced pressure region 44. Specifically, bypass conduit 48 extends into fluid communication with solids separator 26 and includes a bypass inlet 50 disposed proximate particulate collection region 38. Additionally, bypass conduit 48 includes a bypass outlet 52 disposed proximate reduced pressure region 44 created by pressure reduction device 42.

As the discharged fluid from submersible pump 15 is forced through pressure reduction device 42, a reduced pressure at reduced pressure region 44 is created. This reduced pressure creates a suction or vacuum in bypass conduit 48 that draws a concentrated mixture of solid particulates and fluid into bypass conduit 48 via bypass inlet 50. Thus, the solid particulates are removed from solids separator 26 at a position upstream of submersible pump 15, drawn through bypass conduit 48, and drawn, i.e. reinjected, into the discharged wellbore fluid stream at a position downstream from submersible pump 15. In this manner, the solid particulates can be routed past the working components of submersible pump 15 while still being carried away by the discharged fluid from pump 15.

Figure 2:
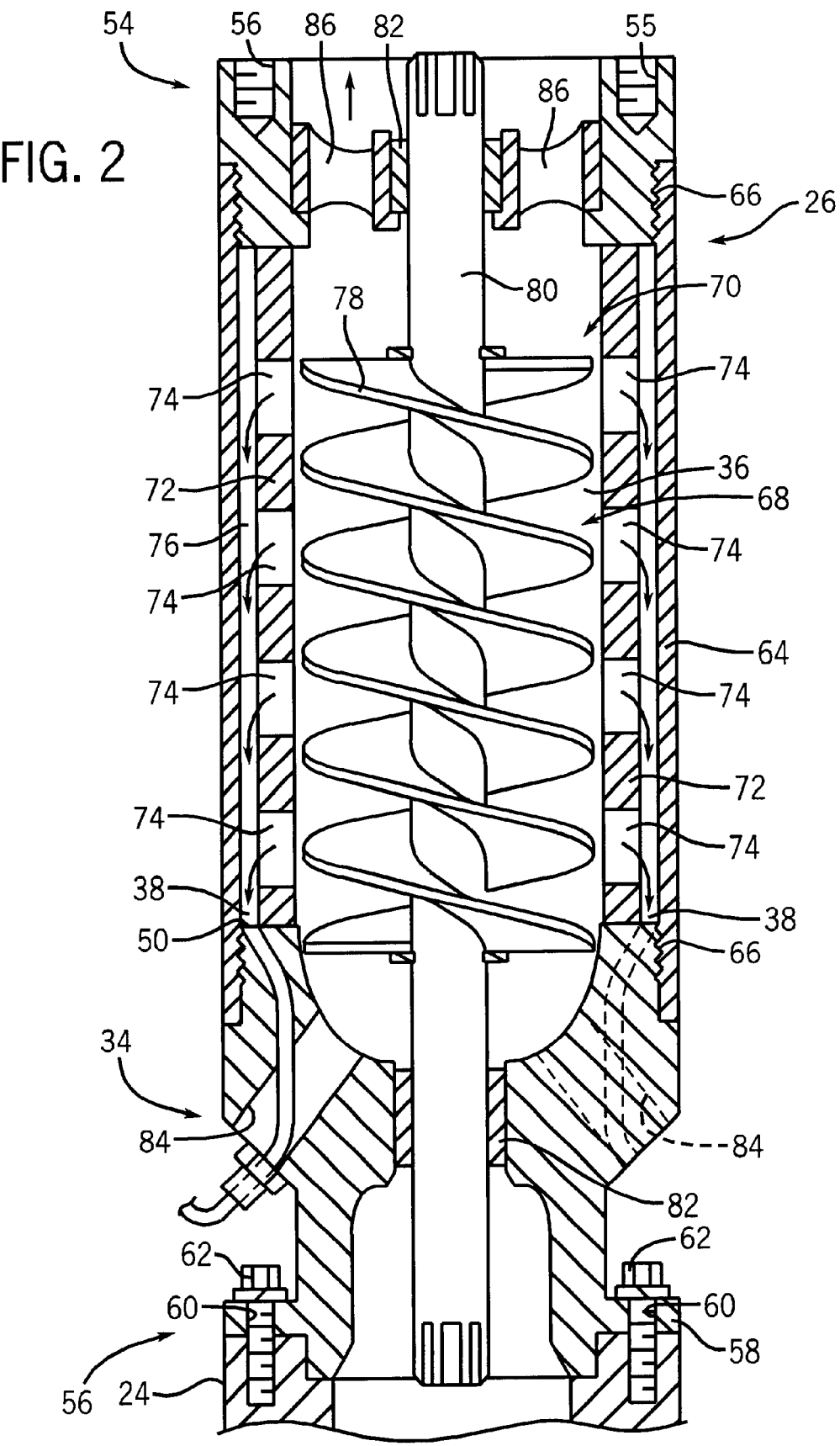
FIG. 2 is a cross-sectional view of a solids separator, according to an embodiment of the present invention.

Referring generally to FIG. 2, an exemplary embodiment of solids separator 26 is illustrated. In this embodiment, solids separator 26 includes an upper connector end 54 by which solids separator 26 is connected to submersible pump 15. Upper connector end 54 may include a plurality of threaded apertures 55 for receiving fasteners, such as bolts, as is commonly known to those of ordinary skill in the art. Similarly, solids separator 26 includes a lower connector end 56 configured for connection to motor protector 24. Lower connector end 56 may include, for example, a flange 58 having a plurality of openings 60 for receiving fasteners, such as bolts 62.

Solids separator 26 includes an outer housing 64 extending between upper connection region 54 and lower connection region 56. Outer housing 64 may be connected to upper connector end 54 and lower connection end 56 by, for instance, threaded engagement at a pair of threaded regions 66. Outer housing 64 also forms the outer wall of a hollow interior region 68. Hollow interior 68 includes solids separation region 36 and particulate collection region 38.

An inducer 70 is disposed in hollow interior 68, and is designed to impart a generally circular, e.g. helical, motion to the wellbore fluid that passes through hollow interior 68. The circular motion creates centrifugal forces which act on the heavier, solid particulate matter to move the solids radially outward. As the solid particulates are forced outwardly, they pass through a baffle wall 72 having a plurality of openings 74. The solid particulates then are allowed to settle through an outer radial passage 76 formed between baffle wall 72 and outer housing 64. The sand and other solid materials settle into particulate collection region 38 to form a slurry that may be intaken through bypass inlet 50.

In the illustrated embodiment, inducer 70 includes a generally helical vane 78 mounted to a rotatable drive shaft 80. Drive shaft 80 is the power shaft that ultimately extends from submersible motor 16 through hollow interior 68 to submersible pump 15 to power submersible pump 15. In this embodiment, drive shaft 80 is supported by a pair of bearings 82 disposed in upper connector end 54 and lower connector end 56, respectively. Furthermore, helical vane 78 is mounted to drive shaft 80 for rotation therewith. As drive shaft 80 rotates, helical vane 78 induces the fluid within hollow interior 68 to circulate as it moves upwardly through hollow interior 68.

It should be noted that a variety of inducers 70 may be implemented. For example, inducer 70 can be mounted in a stationary position relative to baffle wall 72 and outer housing 64, while drive shaft 80 is allowed to freely rotate within an axial opening formed through inducer 70. In this embodiment, the wellbore fluid pulled through solids separator 26 by submersible pump 15 similarly would be induced into a circulating upward pattern of motion during movement through hollow interior 68. A variety of other inducer styles, including angled pump intake openings can be utilized to induce a desired fluid motion within solid separator 26.

In operation, submersible motor 16 turns drive shaft 80 to power submersible pump 15. Submersible pump 15 draws wellbore fluid through a plurality of intake openings 84 that serve to form pump intake 34. In the embodiment illustrated, intake openings 84 are disposed through lower connector end 56, and extend between hollow interior 68 and the wellbore environment external to pumping system 14.

As the wellbore fluid is drawn through intake openings 84, it enters hollow interior 68 and is induced into a circulating pattern of motion by inducer 70 during its upward movement through hollow interior 68. The heavier solid particulates move radially outward through openings 74 of baffle wall 72 and settle to particulate collection region 38.

The wellbore fluid from which the solid particulates have been removed, is continually drawn upward through a plurality of separator outlets 86 and into submersible pump 15. Submersible pump 15 moves the wellbore fluid upwardly and discharges a wellbore fluid stream through outlet end 40. The discharged fluid stream is forced through pressure reduction device 42 to cause a lower pressure at reduced pressure region 44. This creates suction or partial vacuum within bypass conduit 40 that acts to draw the slurry of solid particulates into bypass inlet 50 at particulate collection region 38. The solid particulates are drawn through bypass conduit 48 and into reduced pressure region 44 where they enter the discharged fluid stream from submersible pump 15. Thus, many of the solid particulates within the wellbore fluid are routed past the moving components of submersible pump 15 to substantially reduce wear and damage.

Figure 3:
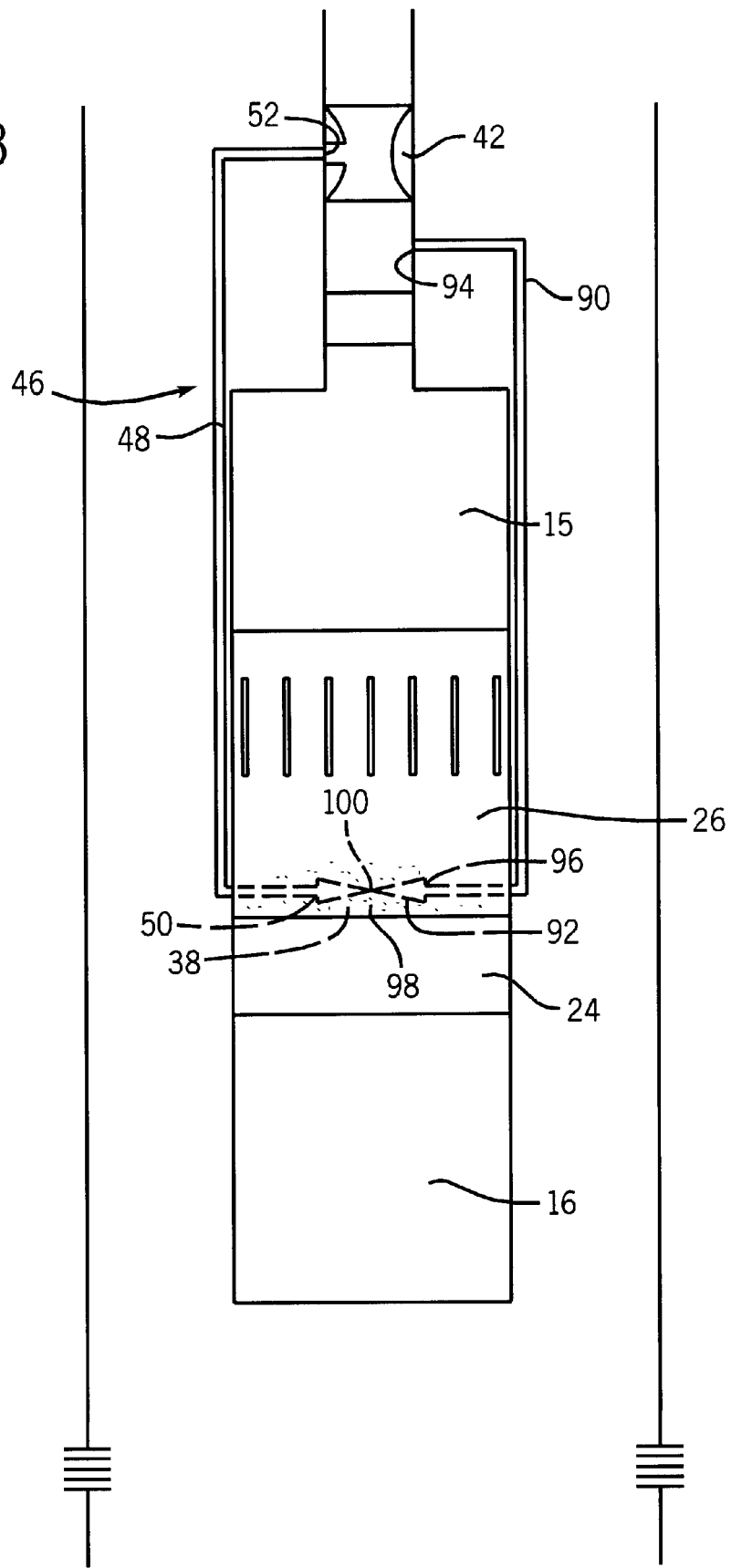
FIG. 3 is a front elevational view of a pumping system positioned in a wellbore, according to an embodiment of the present invention.

Referring generally to FIG. 3, a preferred embodiment of pumping system 14 is illustrated. In the description of this embodiment, and the embodiments that follow, the reference numerals utilized in FIG. 1 are retained where the components are the same or similar to those described with reference to FIG. 1.

In the embodiment illustrated in FIG. 3, a high pressure line 90 as well as a second pressure reduction device 92 have been added. This arrangement is particularly helpful when there is substantial distance between bypass inlet 50 and bypass outlet 52. High pressure line 90 is connected in fluid communication with the high pressure fluid discharged from submersible pump 15. Preferably, high pressure line 90 includes an inlet 94 disposed generally between submersible pump 15 and pressure reduction device 42, e.g. a venturi. High pressure line 90 also includes an outlet 96 connected to bypass inlet 50 across second pressure reduction device 92.

As submersible pump 15 discharges a high pressure fluid stream, a portion of this stream is picked up by inlet 94 and forced through high pressure line 90 and second reduction pressure device 92. When this high pressure fluid flows through second pressure reduction device 92, a reduced pressure region 98 is created. It is desirable that device 92 be located proximate to the particulate collection region 38 such that reduced pressure region 98 may draw the solid particulates into the fluid flowing from high pressure line 90 into bypass 46.

As will be explained more fully below, pressure reduction devices 42 and 92, each preferably utilize a venturi type device, such as a jet pump, venturi, siphon or eductor, to permit rapid fluid flow through the pressure reduction device while creating a low pressure region proximate thereto. For example, the fluid in high pressure line 90 rapidly flows through a venturi 100 at second pressure reduction device 92 and into bypass conduit 48 at bypass inlet 50. As the fluid flows through venturi 100, the solid particulates in particulate collection region 38 are drawn into the stream of fluid moving from pressure line 90 to bypass 46 because of the low pressure created at reduced pressure region 98 due to venturi 100.

Figure 4:
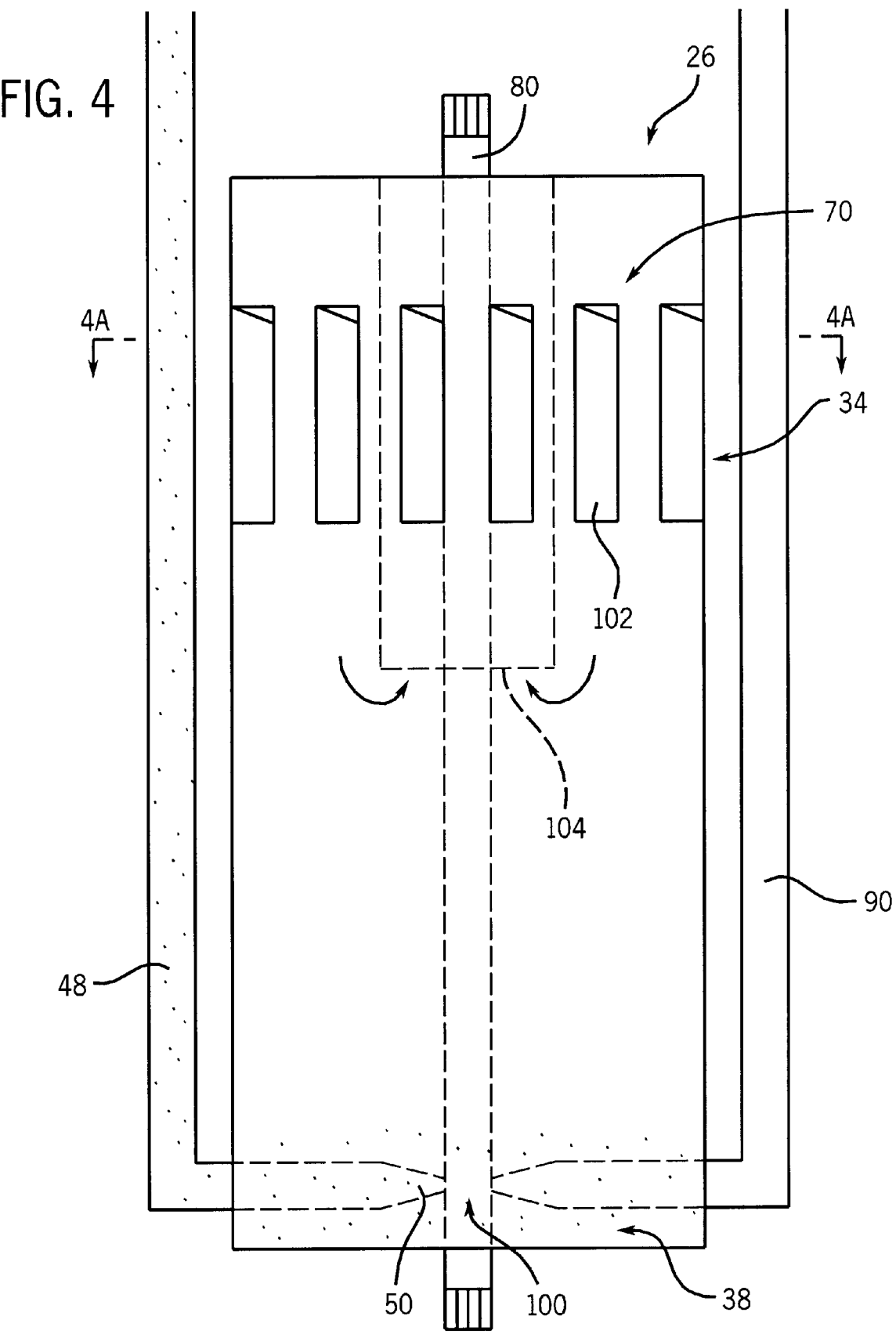
FIG. 4 is a front view of the solids separator illustrated in FIG. 3 showing internal components in dashed lines.
Figure 4A:
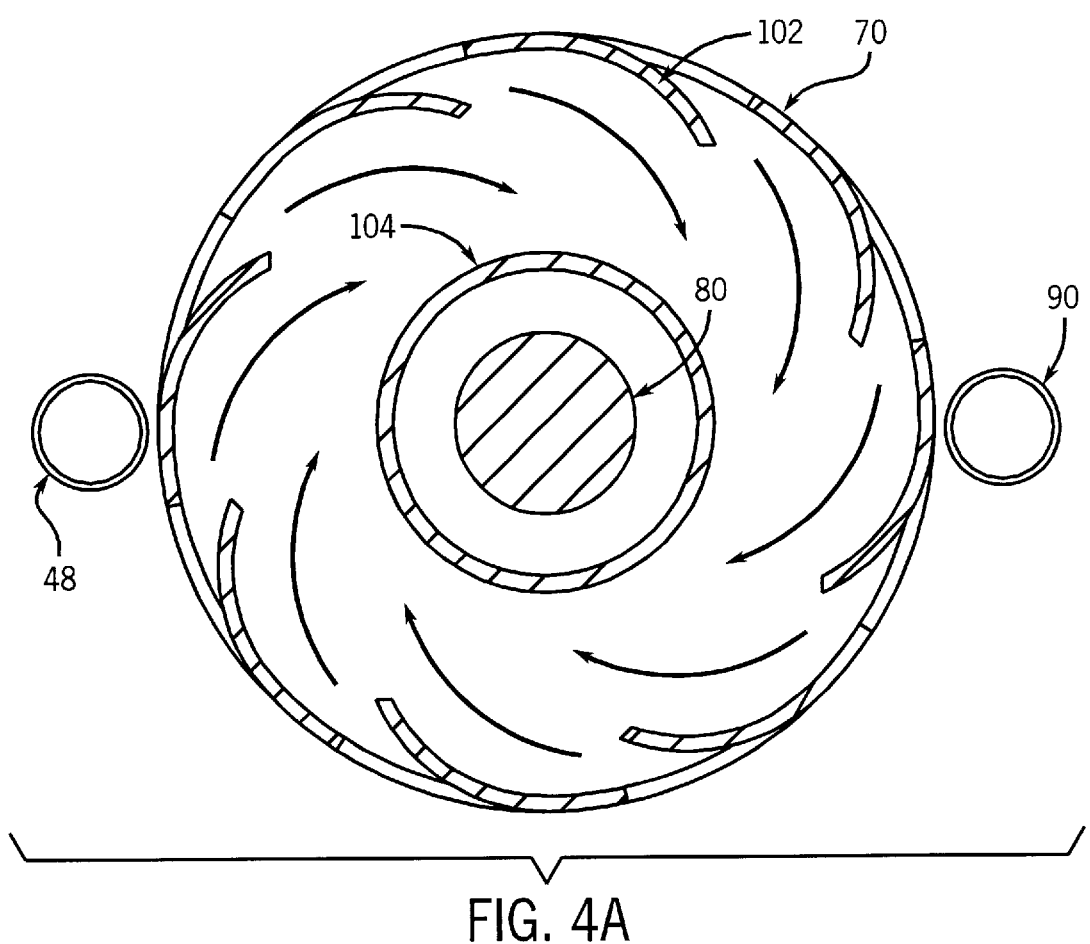
FIG. 4A is a cross-sectional view taken generally along line 4A—4A of FIG. 4.

Referring generally to FIGS. 4 and 4A, an alternate embodiment of solids separator 26 is illustrated. In this embodiment, inducer 70 includes a plurality of angled or curved intakes 102 that serve to create pump intake 34. As wellbore fluid is drawn through angled intake openings 102, the fluid is induced into a circular pattern of flow within solid separator 26. The heavier solid particulates generally move to the outer radial regions of the hollow interior of solids separator 26. The solids are allowed to settle and collect in particulate collection region 38 where they are drawn into bypass conduit 48 via bypass inlet 50 at venturi 100. The fluid from which the solid particulates have been removed is drawn upwardly into submersible pump 15 through an outlet tube 104. The embodiment described with reference to FIGS. 4 and 4A is another example of a variety of solids separators that can be incorporated into the present invention for combination with a submersible pumping system 14.

Figure 5:
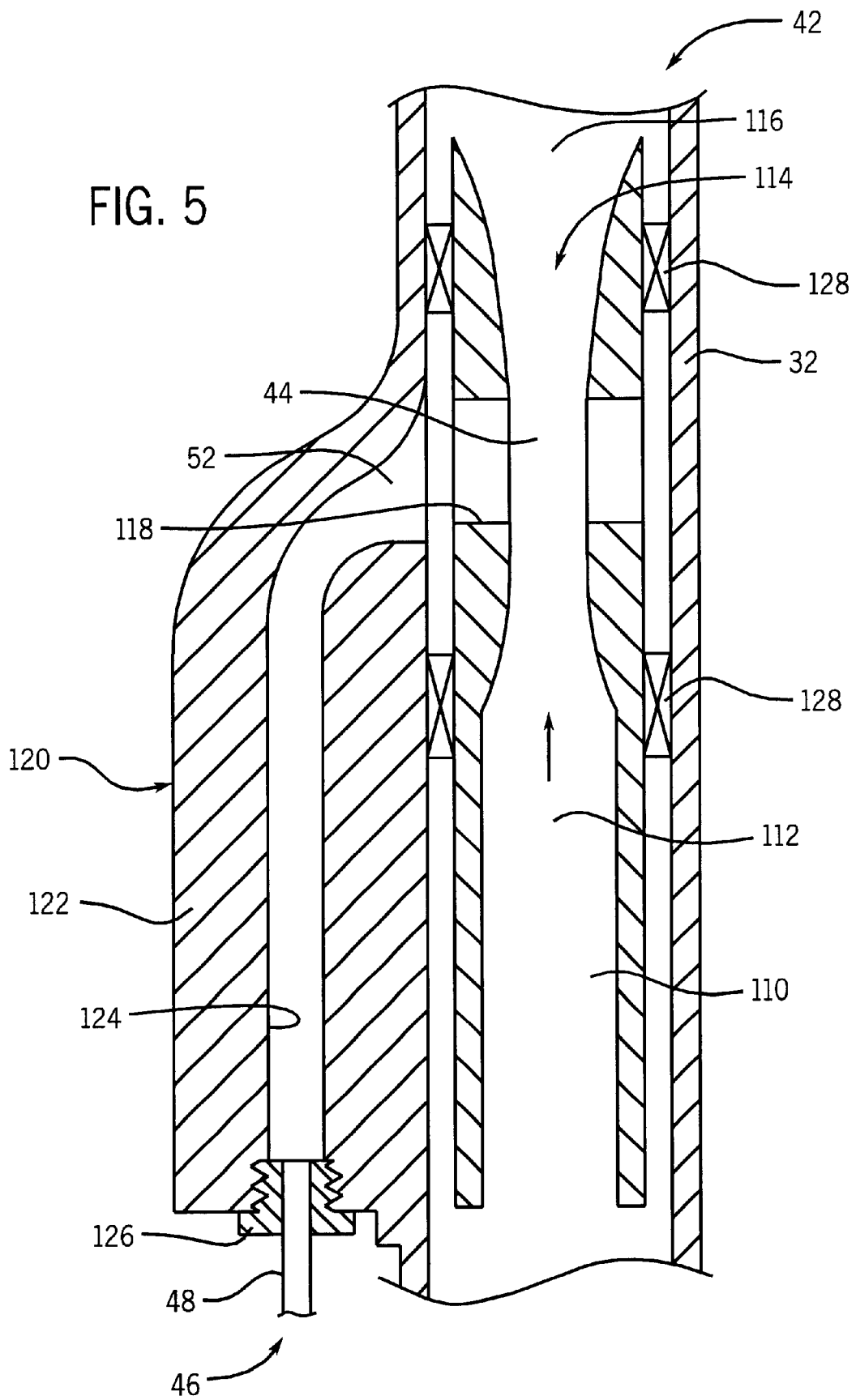
FIG. 5 is a cross-sectional view of a pressure reduction device as utilized in the system illustrated in FIGS. 1 or 3.
Figure 6:
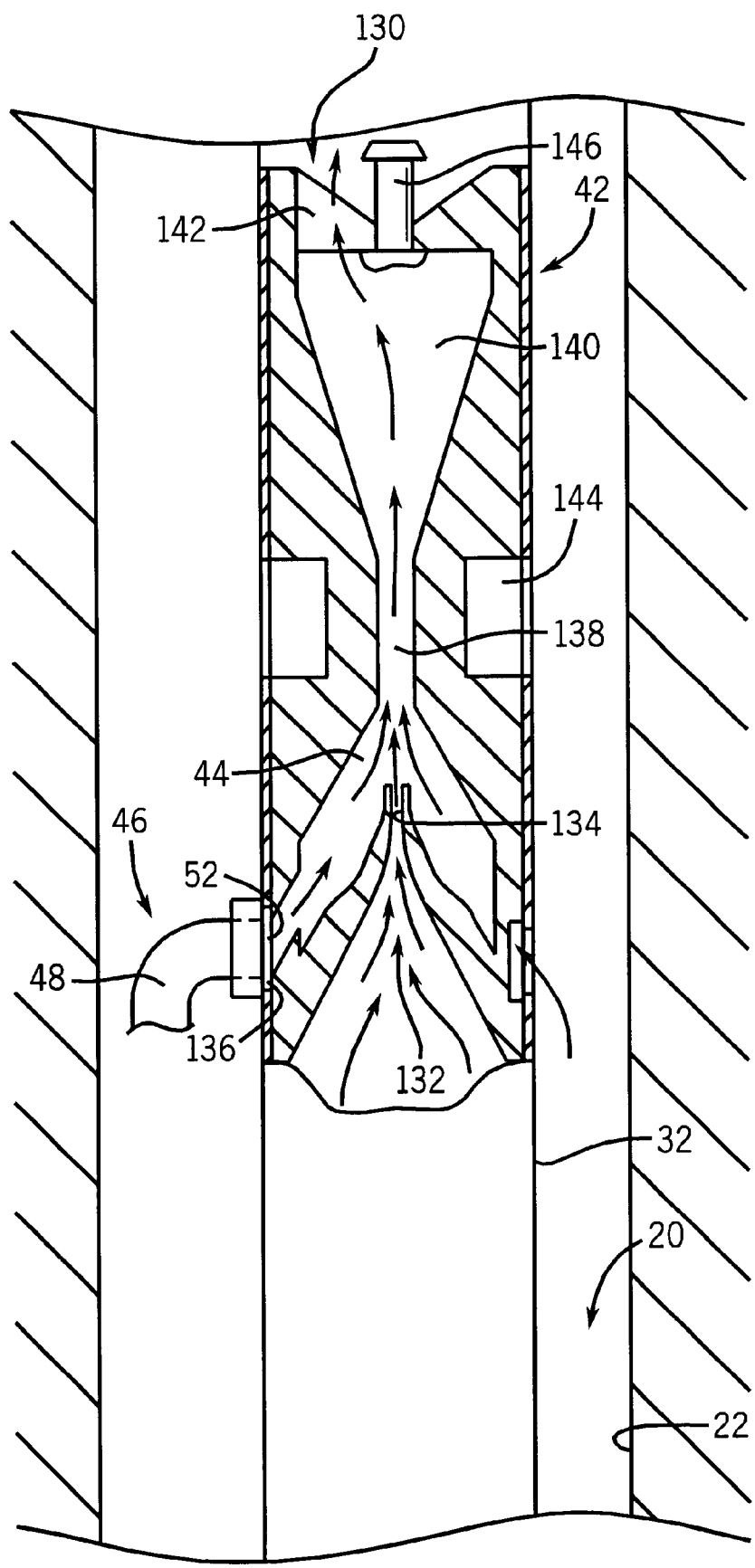
FIG. 6 is an alternate embodiment of a low pressure device as utilized in the system illustrated in FIGS. 1 or 3.

Referring generally to FIGS. 5 and 6, preferred embodiments of pressure reduction devices are described. Both of these designs utilize a venturi to create a low pressure region proximate a stream of moving fluid. Additionally, the pressure reduction devices illustrated in FIGS. 5 and 6 are described as receiving the fluid stream discharged from submersible pump 15. However, either of these devices can be readily utilized as second pressure reduction device 92 and venturi 100 if it is necessary or desirable to use second pressure reduction device 92 for a specific pumping system design.

Referring now to FIG. 5, pressure reduction device 42 includes a flow through passage 110 having an upstream region 112, a venturi 114 and an expansion region 116 on the downstream side of venturi 114. A radial opening 118 is formed through pressure reduction device 42 at venturi 114.

As fluid flows through passage 110 and venturi 114, the velocity of the fluid increases, and thereby creates a lower pressure at reduced pressure region 44. The reduced pressure region 44 is disposed in fluid communication with bypass outlet 52 and bypass 46 via radial opening 118. Thus, a suction or partial vacuum is created in bypass conduit 48 to draw the solid particulate slurry therethrough and into venturi 114. From venturi 114, the solid particulates are carried into expansion region 116 and on through production tubing 32.

In the illustrated embodiment, a side pocket mandrel 120 is utilized to direct the flow of solid particulates into venturi 114 of pressure reduction device 42. Side pocket mandrel 120 includes a housing 122 having a passage 124 through which the solid particulates flow to bypass outlet 52. If a side pocket mandrel 120 is utilized to create bypass outlet 52, bypass conduit 48 may be connected with housing 122 and passage 124 by an appropriate fitting 126.

Additionally, pressure reduction device 42 may be designed for selective retrieval from production tubing 32. To this end, pressure reduction device 42 is mounted within production tubing 32 by appropriate packing 128 to permit retrieval of the pressure reduction device from the surface by, for instance, a wireline, as is commonly known to those of ordinary skill in the art.

Another embodiment of a pressure reduction device 42 is illustrated in FIG. 6. In this design, a venturi also is utilized to create a low pressure area for drawing the solid particulate slurry into a fluid stream. Again, although this design is described as mounted in production tubing 32, it also could be utilized in forming second pressure reduction device 92.

In the embodiment illustrated in FIG. 6, pressure reduction device comprises a jet pump 130. As shown, fluid discharged from submersible pump 15 flows into a jet pump nozzle 132. Then, the fluid is forced from nozzle 132 through a narrower orifice 134. As the fluid moves through orifice 134, its velocity is increased, thereby creating a lower pressure in reduced pressure region 44. Low pressure region 44 is in fluid communication with bypass 46 through an opening 136 formed through production tubing 132.

The low pressure in reduced pressure region 44 draws the solid particulate mixture through conduit 48 and bypass outlet 52 into jet pump 130 for mixing with the discharged fluid stream passing through jet pump nozzle 132 and narrow orifice 134. The discharged fluid stream and the solid particulate slurry are mixed at a throat area 138. After flowing through throat 138, the mixture moves into an expanded diffuser region 140, and exits jet pump 130 through a jet pump outlet 142 for continued flow through production tubing 32.

Jet pump 130 may include a latch mechanism 144. Latch mechanism 144 maintains jet pump 130 at a specific, desired location within production tubing 32. Furthermore, jet pump 130 also may include a wireline connector 146 to facilitate retrieval or replacement of this pressure reduction device by a wireline.

Referring generally to FIG. 7, a preferred embodiment of pumping system 14 is illustrated that is operable to backflush portions of the system with liquid. Occasionally, portions of the fluid flow paths of system 14 handling the solid particulate slurry may become clogged with sand or other solid particulate. Areas where flow is constricted, such as bypass conduit 48 and pressure reduction devices 42 and 92, are especially vulnerable to clogging. Clogged fluid flow paths reduce the efficiency of the system and could lead to the formation of a complete obstruction to fluid flow. Backflushing the system directs fluid back through the system in the direction opposite to the normal direction of fluid flow, thereby dislodging the clogged particulate. Preferably, a clean liquid free of solid particulate is used as the backflush fluid. In the illustrated embodiment, the backflush is pumped down production tubing 32 from the surface. Pumping system 10 includes a check valve 148 that prevents solid particulate from being backflushed through pump 15, possibly damaging the pump. The backflush flows through and dislodge solid particulate matter from pressure reduction device 42, bypass conduit 48, and pressure reduction device 92 within solids separator 26 before exiting the system through another check valve (not shown).

Referring generally to FIG. 8, a preferred embodiment of a pumping system 150 is illustrated that pumps wellbore fluid from a first zone 152 of wellbore 20 to a second zone 154 within wellbore 20. Pumping system 150 removes solid particulate from the wellbore fluid prior to injection of the wellbore fluid into the second zone. Pumping system 150 utilizes a first packer 156 and a second packer 158 to isolate first zone 152 from second zone 154. Pumping system 150 primarily occupies a third zone 160 between the first and second zones. In the illustrated embodiment, the orientation of the submersible pump 15 relative to the submersible motor 16 is reversed from previously discussed embodiments, with the submersible motor 16 being disposed above submersible pump 15.

In operation, water and solid particulates flow into first zone 152 through perforations 162 in wellbore casing 22. The water and solid particulates are drawn into solids separator 26 through intake 34. The water is separated from the solid particulates in solids separator 26 and pumped to third zone 160 through a conduit 164 that passes through first packer 156. The water from the third zone 160 is then drawn into submersible pump intake 166. Water is pumped from submersible pump 15 to a second zone 154 through a discharge conduit 168 that passes through second packer 158. A portion of the water discharged from submersible pump 15 is bypassed though high pressure line 90 to venturi 100. The water flowing through venturi 100 produces a reduced pressure region that draws a sand and water slurry from solids separator 26 into the water discharged from submersible pump 15. The sand and water slurry is conveyed via conduit 170 to the surface. An oil and water separator could also be used to separate a portion of any oil contained in the wellbore fluid within first zone 152 prior to pumping the fluid into second zone 154.

Referring generally to FIG. 8A, an alternative embodiment of the system illustrated in FIG. 8 is shown. In this embodiment a single packer 172 is used to isolate first zone 152 from second zone 154.

Fluid is drawn into wellbore 20 through perforations 162 in wellbore casing 22. System 150 is oriented so that the fluid passes over and cools submersible motor 16 before entering intake 34 of solids separator 26. Clean water is separated from sand and drawn via supply conduit 174 to pump intake 176.

The majority of water is discharged from submersible pump 15 to second zone 154. However, a portion of water is directed via high pressure line 90 to an eductor 167. A sand and water slurry is drawn from solids separator 26 into the portion of water discharged from submersible pump 15 and conveyed via bypass conduit 48 to production tubing 32. This embodiment differs from the embodiment of FIG. 6 in that sand is conveyed to the surface in production tubing 32 of deployment system 30. An expansion chamber 178 above submersible motor 16 accommodates expansion and contraction of motor oil within submersible motor 16.

In addition to solids, gases can also be found in wellbore fluids. Gas separators have been used to separate gases from production fluids. Referring generally to FIG. 9, a preferred embodiment of a solids separator with an integral gas separator 180 is illustrated. The solids separator with an integral gas separator 180 is similar to the solids separator of FIG. 2, it has an outer housing 64 with pump intake 34 though which wellbore fluids enter a hollow interior 68.

Wellbore fluids, including solid particulates, are initially drawn downward within hollow interior 68 after entering through intake 34. Wellbore liquids and gases are directed upward through a shroud 182. However, solid particulates are unable to make the abrupt change in direction and contact a strike plate 184. The solid particulates 186 collect in particulate collection region 38.

A rotatable drive shaft 80 is coupled with an inducer 70 to impart a generally circular, e.g. helical motion to the wellbore fluid. The helical motion of the wellbore fluid causes the lighter gases 188 to migrate to the center of the fluid flow while the heavier liquids 190 remain at the perimeter of the helical fluid flow. The gases at the center enter a second shroud 192 that directs the gases to the wellbore 20 through openings 194.

Referring generally to FIG. 10, a preferred embodiment of a pumping system 196 is illustrated. The solids separator of pumping system 196 does not use, or even have, a rotatable shaft extending through the solids separator. Pumping system 196 includes submersible pump 15, submersible motor 16 and solids separator 198.

Submersible pump 15 draws in wellbore fluids through solid separator 198. Wellbore fluids enter solid separator 198 through solids separator intake 200. Solid particulates are separated from the incoming wellbore fluid in solids separator 198. The wellbore fluid, from which the solid particulates have been removed, is drawn through a supply conduit 174 to a pump intake 166 in submersible pump 15. The wellbore fluid is pumped through submersible pump 15 to production tubing 32.

A portion of the discharged fluid stream is directed through high pressure line 90 to eductor 167. A conduit 202 fluidicly couples the particulate collection region of solids separator 198 to the reduced pressure region of eductor 167. The mixture of solid particulates and fluid from solids separator 198 is mixed with the discharged fluid stream in high pressure line 90 and reinjected through a discharge conduit 204 into the discharged flow stream within production Cubing 32. The solid particulate and wellbore fluid is conveyed to the surface through production tubing 32.

In the illustrated embodiment, submersible motor 16 is disposed above perforations 162 in wellbore casing 20. In this configuration, wellbore fluids flow past and cool submersible motor 16 before entering intake 34.

Referring generally to FIG. 10A, an alternative embodiment of the pumping system of FIG. 10 is illustrated. In the illustrated embodiment, solids separator 198 is disposed at the bottom of pumping system 196, in line with the other components of pumping system 196. This configuration allows the solids separator to be as large in diameter as allowed by the casing 22.

In the illustrated embodiment, pumping system 196 is disposed in wellbore 20 so that intake 34 is below perforations 162 in wellbore casing 22. In this orientation, wellbore fluids still flow around and cool submersible motor 16 before entering intake 34.

Figure 11C:
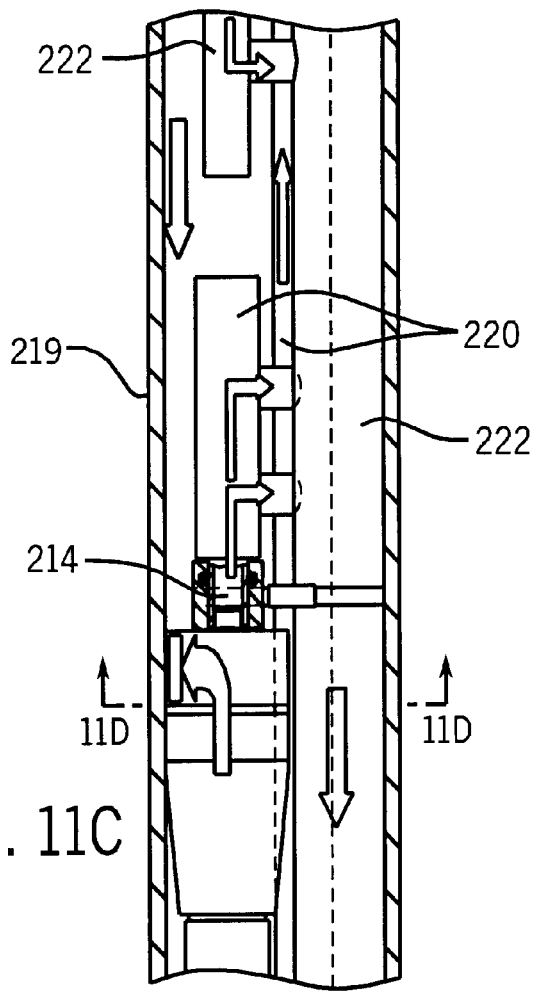
FIG. 11C is a partial front elevational view of a solids separator utilizing the hydrocyclone of FIG. 11A.
Figure 11D:
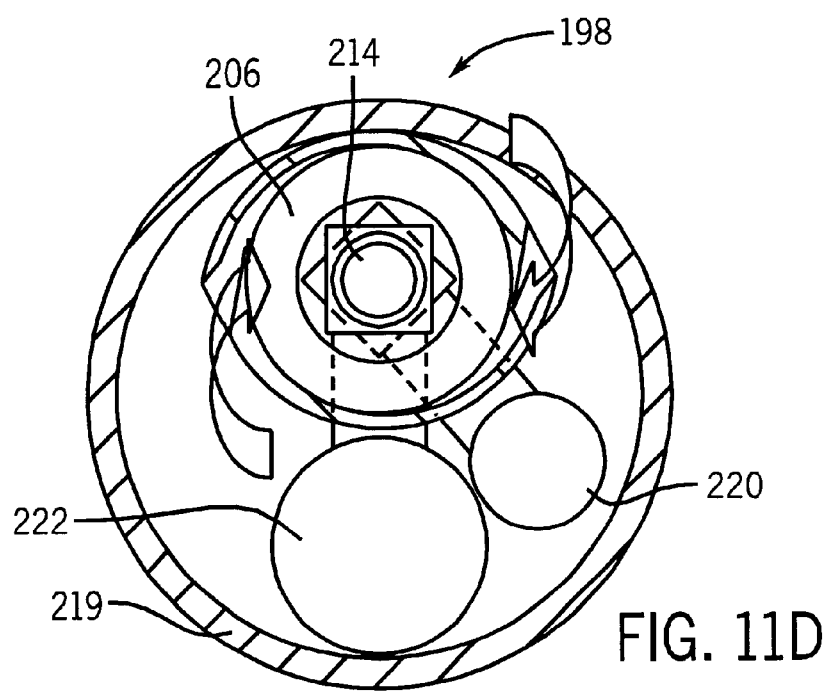
FIG. 11D is a cross-sectional view of the solids separator taken generally along line 11D—11D of FIG. 11C.

Referring generally to FIGS. 11–11D, one preferred embodiment of a solids separator is illustrated. Solids separator 198 includes a hydrocyclone separator 206 that operates more efficiently without a rotatable drive shaft extending through the hydrocyclone separator.

As best illustrated in FIG. 11, hydrocyclone separator 206 operates similarly to the solids separator of FIGS. 4 and 4A. A mixture 208 of solid particulate matter, i.e. sand, and fluid enters hydrocyclone separator 2C6 through a tangential inlet 210. A vortex flow 212 is created within hydrocyclone separator 206 which produces centrifugal forces that act upon the solid particulate and fluid. The less dense portions of mixture 208, i.e. fluid 213, migrate towards the center, or core. Fluid 213 is removed from the core through a fluid outlet 214. A solid particulate and liquid slurry 216, a denser portion of the mixture, exits hydrocyclone separator 206 through an outlet 218.

As best illustrated in FIG. 11A, hydrocyclone separator 206 is extremely elongated. The interior of hydrocyclone separator 206 is tapered, such that the interior diameter decreases as fluid flows downward through hydrocyclone separator 206. As best illustrated in FIG. 11B, flow into the hydrocyclone separator enters targentially through targential inlet 210. Tangential inlet 210 and the tapered sides of hydrocyclone separator 206 produce the vortex flow 212 within hydrocyclone separator 206.

Referring generally to FIGS. 11C and, 11D, hydrocyclone separator 206 is disposed within a housing 219 of solids separator 198. Solids separator 198 also includes an overflow manifold 220 and an underflow manifold 222. Overflow manifold 220 and underflow manifold 222 are used to couple fluids to and from hydrocyclone separator 206. Overflow manifold 220 is fluidicly coupled to fluid outlet 214 and to submersible pump 15. Submersible pump 15 provides the motive force to draw fluids through hydrocyclone separator 206. Under flow manifold 222 is fluidicly coupled to outlet 218 and to a pressure reduction device. The reduced pressure produced by the pressure reduction device draws the slurry from the hydrocyclone separator 206 through the underflow manifold 222.

The embodiment described with reference to FIGS. 11 through 11D is another example of a variety of solids separators that can be incorporated into the present invention for combination with a submersible pumping system.

Figure 12:
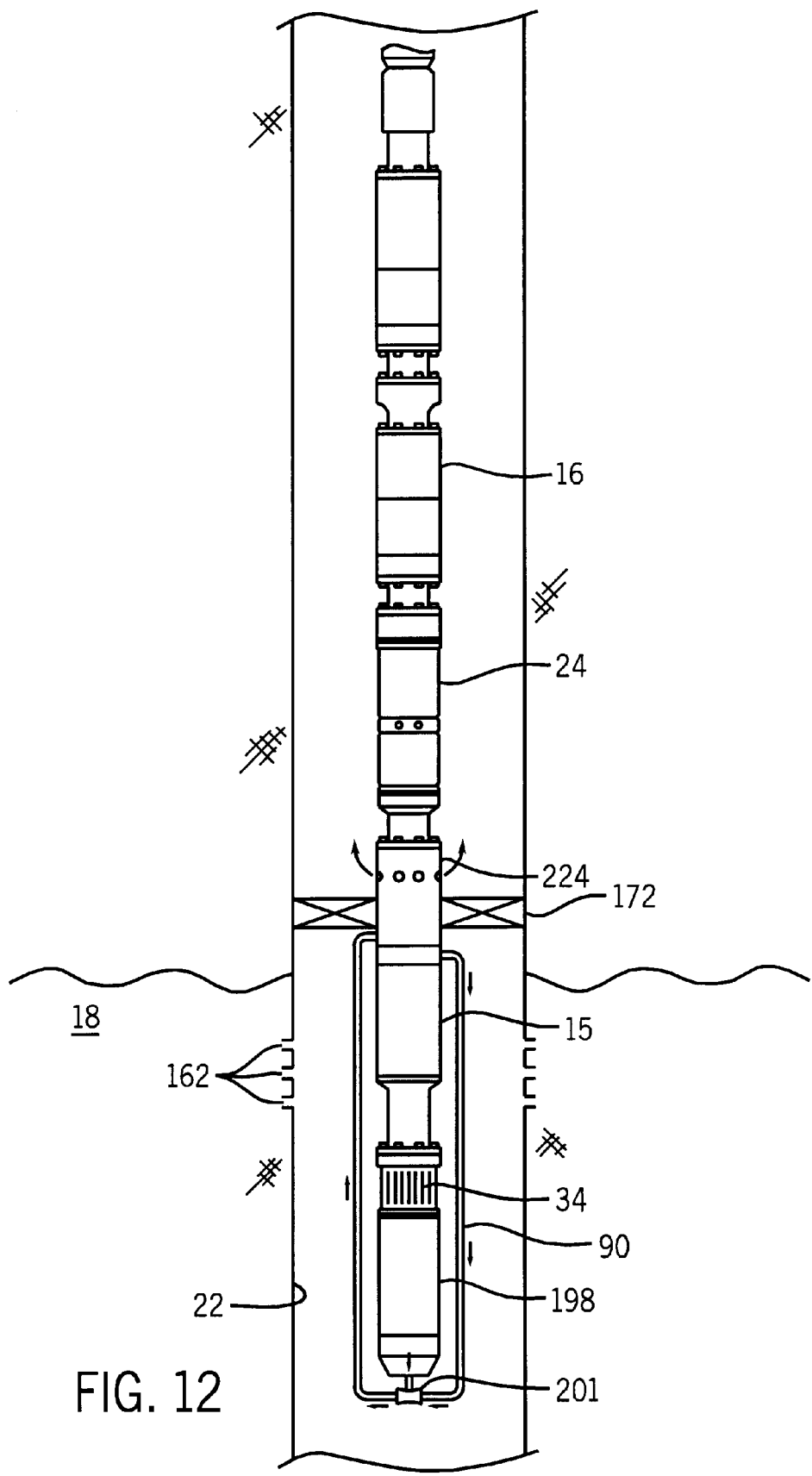
FIG. 12 is a front elevational view of a pumping system disposed in a wellbore to pump fluids from one region of the wellbore to another utilizing the hydrocyclone separator of FIG. 11A, according to an embodiment of the present invention.

Referring generally to FIG. 12, a pumping system is illustrated that utilizes a hydrocyclone separator to pump fluid from one region of a wellbore to another region. A single packer 172 is used to isolate a first zone 152 from a second zone 154 of the wellbore 20. Fluid from the first zone 152 is pumped by the pumping system to the second zone, for ultimate removal from wellbore 20. Submersible pump 15 includes a discharge head 224 that directs the discharge of the pumping system into wellbore 20.

It will be understood that the foregoing description is of preferred embodiments of this invention, and that the invention is not limited to the specific forms shown. For example, a variety of submersible pumping systems may be utilized; various inducers may be implemented to separate solid particulates from the wellbore fluid; a variety of pressure reduction devices can be incorporated into the system; and one or more pressure reduction devices may be incorporated into the system at different points to facilitate movement of the solid particulates independent of the main wellbore fluid flow stream. These and other modifications may be made in the design and arrangement of the elements without departing from the scope of the invention as expressed in the appended claims.

What is claimed is:

1. A system for pumping a wellbore fluid while reducing detrimental effects of solids dispersed in the wellbore fluid, comprising:
    a solids separator separating a portion of solids dispersed in a wellbore fluid from the wellbore fluid, the solids separator producing a first fluid flow without the portion of solids and a second fluid flow including the portion of solids;
    a submersible pump that intakes the first fluid flow from the solids separator; and
    a submersible motor coupled to the submersible pump to provide power thereto,
    wherein a drive shaft extends from the submersible motor to the a bypass tube extending from the solids separator to a location on the submersible pumping system downstream of the submersible pump, whereby the second fluid flow comprising the portion of solids flows through the bypass tube to bypass the submersible pump before reinjected into a fluid discharge stream of the submersible pump; and submersible pump and the solids separator includes a hollow interior through which the drive shaft extends.

2. The system as recited in claim 1, wherein the solids separator comprises a hydrocyclone separator.

3. The system as recited in claim 2, wherein the hydrocyclone separator has an interior diameter that decreases as fluid flows through the hydrocyclone separator.

4. The system as recited in claim 1, wherein the drive shaft is drivingly coupled to an impeller within the hollow interior of the solids separator.

5. The system as recited in claim 1, wherein the solids separator comprises a wellbore fluid intake.

6. The system as recited in claim 1, comprising a check valve, disposed in the fluid discharge stream of the submersible pump between the submersible pump and the location on the submersible pumping system to which the bypass tube extends, such that fluid provided from a surface supply may enter the bypass tubing but is prevented from entering the submersible pump.

7. The system as recited in claim 1, comprising a member to fluidicly isolate a first region of a wellbore from a second region of the wellbore, wherein the system draws fluid from the first region, removes a portion of solid particulates from the fluid, and pumps the fluid, minus the portion of solid particulates, from the first region to the second region.

8. The system as recited in claim 7, wherein the portion of solid particulates is conveyed to a surface receiver.

9. The system as recited in claim 1, the solids separator including a gas separator.

10. A system for pumping a wellbore fluid while reducing detrimental effects of solids dispersed in the wellbore fluid, comprising:
    a solids separator that separates a portion of solids dispersed in a wellbore fluid from the wellbore fluid, the solids separator producing a first fluid flow without the portion of solids and a second fluid flow including the portion of solids;
    a submersible pump that intakes the first fluid flow from the solids separator;
    a bypass tube extending from the solids separator to a location on the submersible pumping system downstream of the submersible pump, whereby the second fluid flow comprising the portion of solids flows through the bypass tube to bypass the submersible pump before being reinjected into a fluid discharge stream of the submersible pump, wherein at least a portion of the fluid discharge stream is directed through a venturi, and an exit end of the bypass tube is disposed proximate a low pressure region created by the venturi; and
    a submersible motor coupled to the submersible pump to provide power thereto.

11. The system as recited in claim 10, wherein a drive shaft extends from the submersible motor to the submersible pump.

12. The system as recited in claim 10, further comprising a pressure reduction device disposed proximate an inlet end of the bypass tube to facilitate movement of the plurality of solid particulates into the bypass tube.

13. A submersible pumping system able to reduce wear on a submersible pump by routing solid particulates around the submersible pump, comprising:
    a submersible pump able to intake a fluid and discharge the fluid in a fluid discharge stream;
    a submersible motor connected to the submersible pump by a drive shaft to power the submersible pump;
    a particulate separator having a separator region and a particulate collection region, the particulate separator being disposed such that the fluid flows into the particulate separator prior to entering the submersible pump;
    a pressure reduction device having a venturi region disposed to receive the fluid discharge stream such that a low pressure region is created as the fluid discharge stream moves through the venturi region; and
    a bypass connected to the pressure reduction device proximate the low pressure region and to the particulate separator proximate the particulate collection region to draw solid particulates from the particulate collection region and to direct them into the fluid discharge stream;
    wherein the submersible motor is disposed below the particulate separator in a generally vertical orientation of the submersible pumping system.

14. The submersible pumping system as recited in claim 13, further comprising a second pressure reduction device connected to the bypass at the particulate collection region.

15. The submersible pumping system as recited in claim 14, wherein the second pressure reduction device includes a venturi region.

16. The submersible pumping system as recited in claim 15, wherein the second pressure reduction device comprises a jet pump.

17. The submersible pumping system as recited in claim 16, wherein the pressure reduction device comprises a jet pump.

18. The submersible pumping system as recited in claim 15, wherein the second pressure reduction device comprises an eductor.

19. The submersible pumping systems recited in claim 13, wherein the particulate separator comprises a hydrocyclone separator.

20. The submersible pumping system as recited in claim 13, wherein the pressure reduction device comprises a jet pump.

21. The submersible pumping system as recited in claim 13, wherein the pressure reduction device comprises an eductor.

22. The submersible pumping system as recited in claim 13, wherein the particulate separator is configured to input a circular motion to the fluid.

23. The submersible system as recited in claim 22, wherein the particulate separator is disposed between the submersible pump and the submersible motor such that the drive shaft extends therethrough.

24. The submersible system as recited in claim 23, the particulate separator comprising an impeller drivingly coupled to the drive shaft.

25. The submersible system as recited in claim 13, comprising a member to fluidicly isolate a first region of a wellbore from a second region of the wellbore, wherein the submersible system draws fluid from the first region, removes a portion of solid particulates from the fluid, and pumps the fluid, minus the portion of solid particulates, from the first region to the second region.

26. The submersible system as recited in claim 25, wherein the portion of solid particulates is conveyed to a surface receiver.

27. The submersible system as recited in claim 13, the particulate separator including a gas separator.

28. A method for pumping a production fluid, comprising:
powering a submersible pump with a submersible motor;
intaking a wellbore fluid;
pumping the wellbore fluid with the submersible pump; and
separating solid particulates from the wellbore fluid prior to pumping by the submersible pump; and
disposing a particulate separator intermediate the submersible pump and the submersible motor.

29. The method as recited in claim 28, further comprising reinjecting the solid particulates into a fluid discharge stream of the submersible pump.

30. The method as recited in claim 29, further comprising creating a low pressure region in the fluid discharge stream to draw the solid particulates into the fluid discharge stream.

31. The method as recited in claim 30, further comprising creating a low pressure area generally between a wellbore fluid intake and the submersible pump to withdraw the solid particulates from the wellbore fluid to be pumped by the submersible pump.

32. The method as recited in claim 29, further comprising inducing the wellbore fluid to circulate intermediate the wellbore fluid intake and the submersible motor.

33. The method as recited in claim 29, further comprising conveying solid particulates to a surface receiver.

34. The method as recited in claim 28, further comprising fluidicly isolating a first region of the wellbore from a second region and pumping the wellbore fluids minus the solid particulates from the first region to the second region.

35. The method as recited in claim 28, comprising assembling the submersible motor, submersible pump, and particulate separator to form a tool string, wherein the submersible motor is disposed proximate to the bottom of the tool string.

36. The method as recited in claim 35, comprising positioning the tool string in the wellbore so that production fluid drawn into the particulate separator flows over the submersible motor.

* * * * *